(No Model.)
J. M. MITCHELL.
WIND APPARATUS FOR GENERATING ELECTRICITY AND CHARGING SECONDARY BATTERIES.
No. 452,546. Patented May 19, 1891.
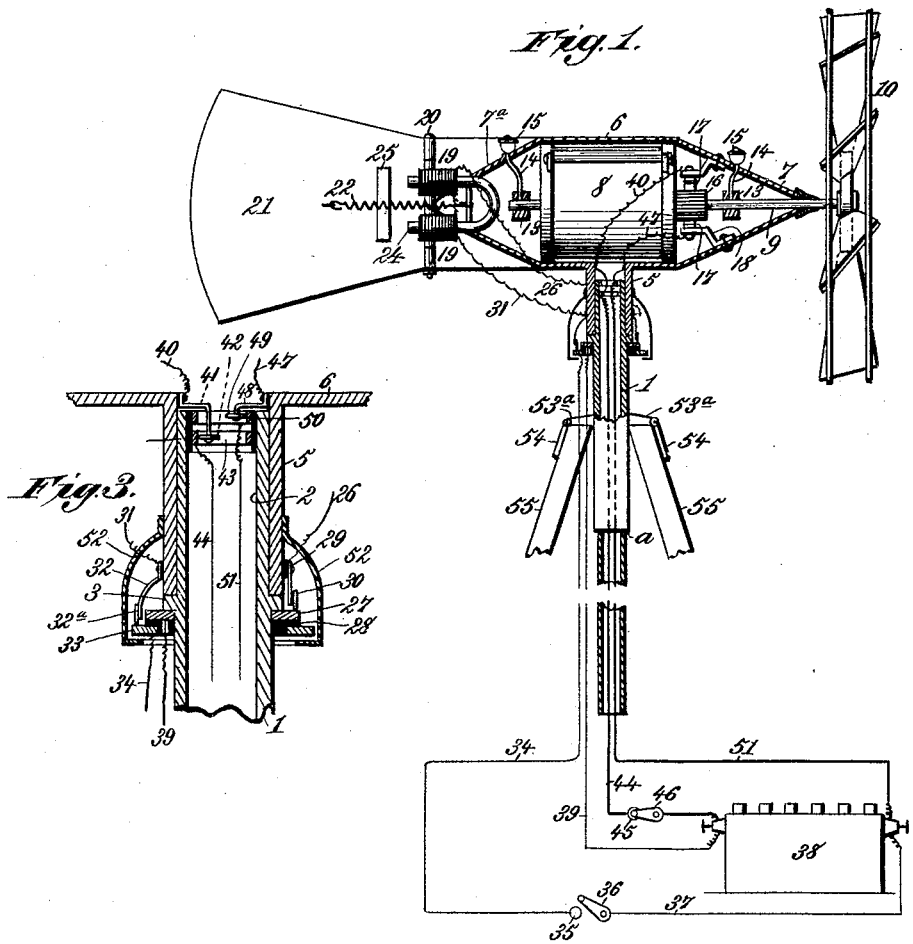
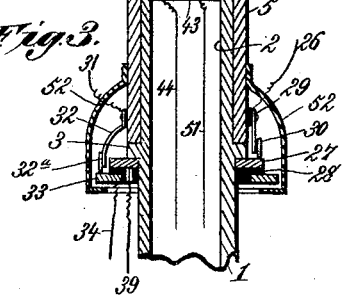
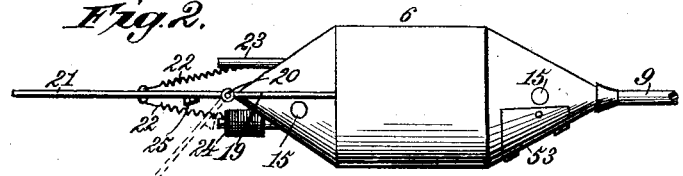
Witnesses.
Inventor:
James M. Mitchell.
By James L. Norris.
Atty.

UNITED STATES PATENT OFFICE.

JAMES M. MITCHELL, OF LAWRENCEVILLE, ASSIGNOR OF ONE-HALF TO WILLIAM A. CAMP, OF GREENWAY, GEORGIA.

WIND APPARATUS FOR GENERATING ELECTRICITY AND CHARGING SECONDARY BATTERIES.

SPECIFICATION forming part of Letters Patent No. 452,546, dated May 19, 1891.

Application filed December 15, 1890. Serial No. 374,785. (No model.)

*To all whom it may concern:*

Be it known that I, JAMES MADISON MITCHELL, a citizen of the United States, residing at Lawrenceville, in the county of Gwinnett and State of Georgia, have invented new and useful Improvements in Wind Apparatus for Generating Electricity and Charging Secondary Batteries, of which the following is a specification.

My invention relates to that class or type of mechanism whereby the natural powers or forces are sought to be utilized for the generation of one or more electric currents, the object being to supply electric currents having suitable energy for the operation of electric-arc lamps or other devices, or, on the other hand, for incandescent lamps, or doing other work, such as operating motors, and for other purposes.

It is the purpose of my invention to provide a simple and efficient apparatus in which the motive power is the wind, and to so construct the parts and organize the same that the wind-wheel shall be at all times presented to the direct action of the air-currents without breaking the electrical connections between the poles of the dynamo turning with said wheel.

It is my purpose, also, to provide an apparatus of the type specified having a power-shaft which is driven by a wind-wheel constantly presented to the direct action of the air-currents by a tail or directing vane, said shaft traversing a drum or casing containing the dynamo and pivotally mounted upon a pole, upright frame, or other suitable support, the poles of the dynamo being so connected to the line-wire or electrical conductors that the pivotal movement of the drum is permitted without interruption of the current generated.

It is my purpose, also, to provide an apparatus for generating an electric current in which the armature-shaft of the dynamo is the shaft of a wind-wheel, the operative parts being mounted upon a pivotal support having means by which the wind-wheel is normally shifted with each change of the wind to receive the direct action of the air-currents, and to combine therewith means whereby the generated current may be utilized to operate the directing vane or tail of the wind-wheel in such manner as to render the latter inoperative.

To these ends my invention consists in the several novel features of construction and new combinations of parts hereinafter fully described, and then defined and pointed out in the claims following this specification.

To enable others skilled in the art to which my invention belongs to understand and use the same, I will proceed to describe said invention in detail, reference being had to the accompanying drawings, in which—

Figure 1 is a vertical section, partly in elevation, illustrating the entire apparatus. Fig. 2 is a plan view, the wind-wheel being omitted; and Fig. 3 is a detail section upon an enlarged scale, showing the construction and arrangement of the parts by which electrical connection is maintained between the rigid and the rotating supports.

The reference-numeral 1 in the drawings is used to designate a support for the operative parts. As shown in the drawings, this support consists of a strong upright set in the earth or mounted at its base in or upon a movable platform. In place of the upright or pole 1, I may, however, use any form of support preferred or an upright of sufficient length to give clearance to the wind-wheel and erect the same upon the roof of a building or other elevated point. Upon the upper extremity of this upright is formed or mounted a pivotal bearing 2 of suitable length, having at its lower end a horizontal circular shoulder formed by a collar 3 upon a portion of the upright 1 immediately below the base of the pivot. Upon the pivot 2 is mounted a socket 5, forming part of a drum or casing 6, which may be of either circular or angular form, as may be preferred, the former construction being the one adopted in the present instance. Upon the ends of the drum or casing 6, the axis of which is horizontal, are formed extremities 7 and 7ˣ, which, should the drum be of cylindrical shape, would be either conoidal or conical, the pyramidal or conical shape being that best adapted to the free and unobstructed passage of the wind. The socket 5 is formed or mounted upon the lower side of the casing 6 at or near the central portion thereof, the arrangement of the interior mechanism and the external attachments being such as to render this point the center of gravity, whereby the casing will turn with the minimum degree of friction.

The reference-numeral 8 in the drawings denotes the field-magnet of a dynamo of any known or preferred construction arranged within the casing 6 and substantially filling its interior. The armature of the dynamo is carried by a shaft 9, which traverses the pyramidal extremities 7, and at one end projects through the point thereof to receive the wind-wheel 10. This shaft is supported at or near both ends in any suitable form of bearings 13, mounted upon brackets which are attached to the casing. These bearings are supplied with lubricating material through small pipes 14, having communication with oil-cups 15 upon the exterior. The commutator 16 and the brushes 17 of the dynamo are so well known as to require no specific description, the former being carried by the shaft 9, while the brushes are suitably attached to brackets 18, insulated or formed of insulating material. The wind-wheel 10 also is of familar form, and as these parts form no part of my present invention so far as their structure is concerned they require no further description.

Upon the pyramidal extremity 7ª of the casing 6 opposite the similar end 7, which lies adjacent to the wind-wheel 10, I attach rigidly plates 19, lying in the central vertical plane of the casing, the outward vertical edges of said plates being extended a little beyond the point of the pyramidal end 7ª, on which they are mounted. Upon these vertical edges are formed or mounted hinged or pivotal joints 20, registering with similar devices upon the vertical end edges of a directing vane or tail 21, the latter being thus hinged or pivoted at its inner end to the casing. Upon the sides of the directing-vane are arranged spiral or other springs 22 of substantially equal tension, one end being connected to stop-bars upon a pyramidal extremity 7ª and their other ends to the opposite faces of the directing-vane, which is normally centered or brought into and normally held in a vertical plane passing through the axis of the casing 6. Parallel with this plane and arranged upon each side of the extremity 7ª at a short distance from the opposite faces of the directing-vane are stop-bars 23, the function of which will presently be explained.

Upon one side of the directing-vane 21 is arranged an electro-magnet 24 of horseshoe form, its bent portion being placed within the pyramidal end 7ª, as shown in Figs. 1 and 2. The poles of this magnet are arranged vertically or one above the other within a short distance from one face of the vane 21, upon which is mounted an armature 25, which will be attracted when the magnet is energized and cause the vane or tail to assume the position shown in dotted lines in Fig. 2. The terminal of one of the coils of the electro-magnets 24 is connected by a wire 26 with a conducting-annulus 27, arranged just below the collar 3 on the upright. This annulus is supported by an insulating collar surrounding the upright and having a flange 28, upon which the annulus rests. The wire 26 is attached to the outer face of the socket-piece 5 by any ordinary insulated conductor 29, having upon its end a roll or brush 30, resting and moving upon the upper flat surface of the annulus 27, by which a sufficient contact is obtained. From the terminal of the other coil of the electro-magnet a wire 31 is extended to an insulated contact or conductor 32 on the exterior face of the socket-piece 5 opposite the contact 30, its end being provided with a rolling contact or brush 32ª, resting and moving upon the surface of an annulus 33, lying beneath and upon an insulating-flange of the insulating-collar 28. From the annulus 33 a wire 34 is carried to a contact 35, mounted on any suitable support, upon which is also arranged a switch 36, by which the circuit may be opened and closed at said contact 35, from which a wire 37 is taken to one pole of a secondary battery 38. From the annulus 27 a second wire 39 is taken directly to the other pole of said storage-battery.

The poles of the dynamo are connected as follows: the one by a wire 40 to an insulated conducting-bracket 41, mounted within the upper open end of the socket-piece 5 and provided with a rolling brush 42, resting and moving upon an insulated annulus 43 on the interior face of the tubular pivot-bearing 2, which permits the rotary movement of the socket without disturbing the electrical connections. From this annulus a wire 44 is carried downward in the tubular upright 1 to an exit at or near the lower portion of the upright. From this point said wire is carried directly to a contact 45, near which a switch 46 is arranged, having electrical connection with one pole of the secondary battery 38. From the other pole of the dynamo a wire 47 extends to an insulated conductor 48 on the inner face of the socket 5, having a rolling brush 49 in electrical contact with the inner face of an annulus 50, insulated from the pivotal bearing 2. From this annulus a wire 51 is carried down in the tubular upright to the exit-opening, whence it is taken directly to the other pole of the secondary battery. It will be seen that by simply closing the circuit at the contact 35 the electro-magnet 24 will be energized, and the armature 25 being attracted the vane will swing to the position shown in dotted lines in Fig. 2, whereby the casing 6 will be turned by the force of the wind until the wheel 10 is brought into an inoperative position and the action of the dynamo will cease. Upon opening the switch the springs attached to the vane and casing will at once center the vane.

To prevent the casing being blown off the pivotal bearing 2 in very high gales, I attach to the socket-bearing 5 guards 52, Fig. 3, formed of a suitable metal and having an inwardly-turned flange on their free ends hooking under the edges of the annulus 33. These guards are made of any suitable material.

A door 53 is provided in the casing to give access to the interior.

In erecting the mechanism upon a tower of the kind used in windmills of various construction I may terminate the tubular upright 1 between its ends—as, for example, at the point $a$, Fig. 1. In this case projections $53^a$ would be cast upon or rigidly attached to the severed or upper portion of the tubular upright 1 at right angles therewith, as shown in Fig. 1. Upon the ends of these radial arms, which are of such size as to give suitable strength, are hinged plates 54, which are capable of being adjusted at any angle with the parts to which they are hinged.

The manner of attachment to the tower is as follows: The lower end of the upright 1 is introduced into an opening between posts 55, which may, as shown in Fig. 1, be inclined at a suitable angle, and the radial rigid arms $53^a$ are rested upon the tops of these posts, beveled for the purpose, while the hinged portions 54 are laid upon the outer inclined faces of the posts and are bolted to the latter. A pipe of any suitable metal may be screwed or otherwise inserted in the lower end of the upright to carry the wires.

Inasmuch as it is necessary to avoid too high speed of the dynamo, it will be found that the adjustability of the directing-vane, or rather its elastic yield upon its hinges, will produce this regulating effect upon the speed admirably, this result being due to the change of position of the wind-wheel caused by the constant change of direction in the air-currents.

This invention will be of high value in towns both large and small, as well as in cities where regular plants are not found. It can be used where the suburbs are not easily reached with perfect success in all cases and with a nominal expense, as the motive power is without cost and the initial expense is comparatively small. The currents generated at different times and in different quantities, owing to the variable force of the wind, are safely stored up in the secondary batteries, and thence may be used as they are required for every purpose to which the electric current can be applied.

For interior and exterior lighting and the propulsion of the lighter machinery this apparatus will be found highly useful and practical by reason of its simplicity and the extremely low expense at which each individual apparatus may be maintained.

The switch 36 is generally used when it is necessary to oil the bearings or make repairs, at which times whatever energy is found in the storage-battery may be used for this purpose by simply throwing the switch upon the contact 35 to complete the circuit of the electro-magnet 24 and swing the wind-wheel out of place.

A high speed for the armature may be attained, if desired, by attaching suitable gearing to the shaft.

One advantage of the construction shown by which the operative parts are located in the pivoted casing is that it enables me to greatly diminish the friction which would be produced in the ordinary construction of windmills in which these parts are located at the bottom of the upright or at such a point that the power of the wind-wheel must be transmitted throughout the length of the upright and through gearing or belts to the dynamo.

What I claim is—

1. In a mechanism for generating electricity, the combination, with a drum or casing, of a wind-wheel shaft journaled in the same, a field-magnet surrounding said shaft, an armature and commutator of a dynamo mounted on said shaft, a pivoted support for the casing, conductors connecting the brushes of the dynamo with the device in which the current is used, and means whereby the wind-wheel shall be presented to the action of shifting currents of air without interrupting the flow of the current, substantially as described.

2. In a mechanism for generating electricity, the combination, with a dynamo, of a wind-wheel shaft carrying the armature of the dynamo, a pivoted support for said parts, a storage or secondary battery, conductors connecting the brushes of the dynamo to the poles of the storage-battery, and means whereby the wind-wheel shall be presented to the action of shifting air-currents without interrupting the current, substantially as described.

3. In a mechanism for generating electric currents, the combination, with a dynamo, of a wind-wheel, upon the shaft of which the armature of the dynamo is mounted, a support for said parts, having pivotal bearing, a directing-vane revolving the pivotal part of said support and holding the wind-wheel to the wind, conducting-wires connected to the poles of the dynamo, and devices intermediate of the pivoted and the immovable parts of the support for the dynamo and wind-wheel, whereby the current is maintained as the movable member of the support is shifted by changes of wind, substantially as described.

4. In a mechanism for generating electric currents, the combination, with a dynamo, of a casing inclosing the same, a pivoted support for said casing, a shaft journaled in said casing, a wind-wheel on the shaft, a directing-vane hinged or pivoted on the casing and centered by opposite springs, an electro-magnet mounted on said casing and when energized attracting an armature on the vane, a circuit for the dynamo, connected with the device receiving the generated current, and a derived circuit for the electro-magnet, attracting the vane, the derived circuit being open when the main circuit is closed, and vice versa, substantially as described.

5. In a mechanism for generating electric currents, the combination, with a dynamo, a casing inclosing said dynamo, and a pivoted support for the casing, of a shaft having a wind-wheel driving the armature of said dynamo, a pivotally-mounted directing-vane, springs centering the said vane, an electro-magnet attracting an armature on one side thereof, a circuit for the dynamo, in which are interposed brackets mounted on the pivoted part of the support and having rolling contacts resting on annular conductors on the fixed part of said support, a storage-battery, a circuit for said battery, and a secondary circuit for the electro-magnet, attracting the vane, substantially as described.

6. In a mechanism for generating electric currents, the combination, with a wind-wheel and a dynamo driven thereby, of a pivotal bearing for the operative parts, an upright support for the pivotal bearing, and arms projecting radially from the body of the upright support carrying the pivot, said arms having hinged members adapted to lie upon and be bolted to inclined posts on a tower, substantially as described.

In testimony whereof I have hereunto set my hand in presence of two subscribing witnesses.

JAMES M. MITCHELL.

Witnesses:
   JAMES L. NORRIS,
   JAMES A. RUTHERFORD.